Figure 1:
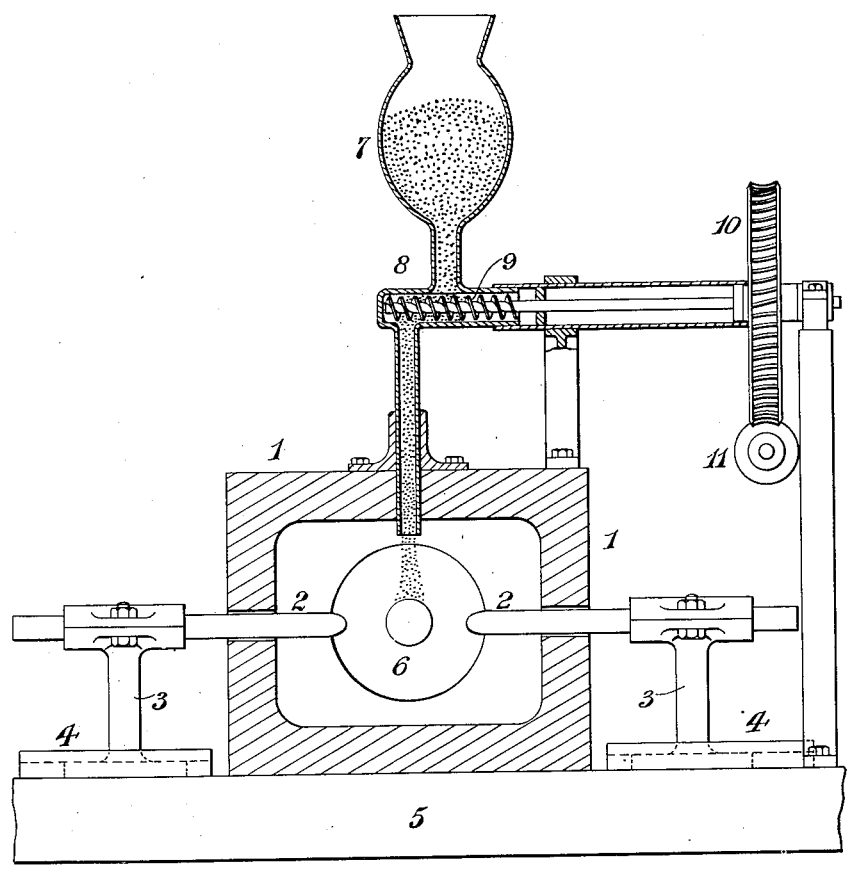

H. A. KENT.
MANUFACTURE AND PRODUCTION OF SILICA GLASS.
APPLICATION FILED AUG. 13, 1910.

1,003,271.

Patented Sept. 12, 1911.

3 SHEETS—SHEET 1.

WITNESSES

INVENTOR

HENRY ANDREW KENT

By Howson & Howson

Attorneys

INVENTOR
HENRY ANDREW KENT

H. A. KENT.
MANUFACTURE AND PRODUCTION OF SILICA GLASS.
APPLICATION FILED AUG. 13, 1910.

1,003,271.

Patented Sept. 12, 1911.

3 SHEETS—SHEET 3.

WITNESSES

INVENTOR
HENRY ANDREW KENT
By Howson & Howson
Attorneys

UNITED STATES PATENT OFFICE.

HENRY ANDREW KENT, OF BOUNDS GREEN, ENGLAND, ASSIGNOR TO THE SILICA SYNDICATE LIMITED, OF LONDON, ENGLAND.

MANUFACTURE AND PRODUCTION OF SILICA GLASS.

1,003,271. Specification of Letters Patent. Patented Sept. 12, 1911.

Application filed August 13, 1910. Serial No. 577,042.

*To all whom it may concern:*

Be it known that I, HENRY ANDREW KENT, a subject of the King of Great Britain and Ireland, of The Poplars, Maidstone Road, Bounds Green, in the county of Middlesex, England, have invented new and useful Improvements in the Manufacture and Production of Silica Glass, of which the following is a specification.

The object of this invention is to produce silica-glass (fused quartz) in an economical and efficient manner and so that it can be obtained in as pure and transparent a condition as may be desired.

According to this invention silica, in the condition of powder, grains, or particles, is caused to fall, or be projected through a heated zone (so that each grain, or particle, falls, or is projected separately and subjected to an equal degree of heat all around) and onto a heated body in such a manner as to form at one operation a homogeneous mass of silica-glass upon the said body; for example, a rod, tube, or article under formation, and made of silica-glass, (which in the following description I will, for brevity, refer to as the heated body) is maintained in a plastic condition by heat applied electrically in a furnace made of silica, or other suitable refractory material through a heated zone of this furnace, and onto this heated body, silica, in the condition of powder, grains, or particles, (which I will refer to as particles) is caused to fall, or be projected, in such manner that the particles separately pass through the heated zone and adhere to whatever portions of the heated body are to receive them so that a homogeneous mass of silica-glass is formed, or built up, upon the said heated body, and this mass can be blown, or molded, or drawn, or otherwise treated by any means usual, or suitable, in the manufacture of glass so as to produce the required silica-glass article. The heated body may, during the deposition of the particles, be rotated, or reciprocated, or have any motion, or motions, given to it as may be necessary to properly distribute the silica-glass thereover as it is formed. The particles of silica may be supplied to the furnace in any suitable way; for instance, through tubes and feeders provided specially for the purpose, or through an electrode, or electrodes, perforated for the purpose, or by any other suitable means so that the particles fall, or are projected separately through the heated zone. When sufficient silica-glass has been formed upon the said heated body by the fusion of the silica particles, the homogeneous silica-glass thus produced at one operation can, as aforesaid, be blown, molded, drawn, or otherwise manipulated, as may be required. The same method of manufacture can also be employed with other suitable means of applying sufficient heat for the fusion of the silica; for example, a blow-pipe flame can be used as the source of heat.

The accompanying drawings illustrate sections of forms of apparatus suitable for carrying out this invention, but I do not limit myself to the use of these particular forms of apparatus.

Figure 2:
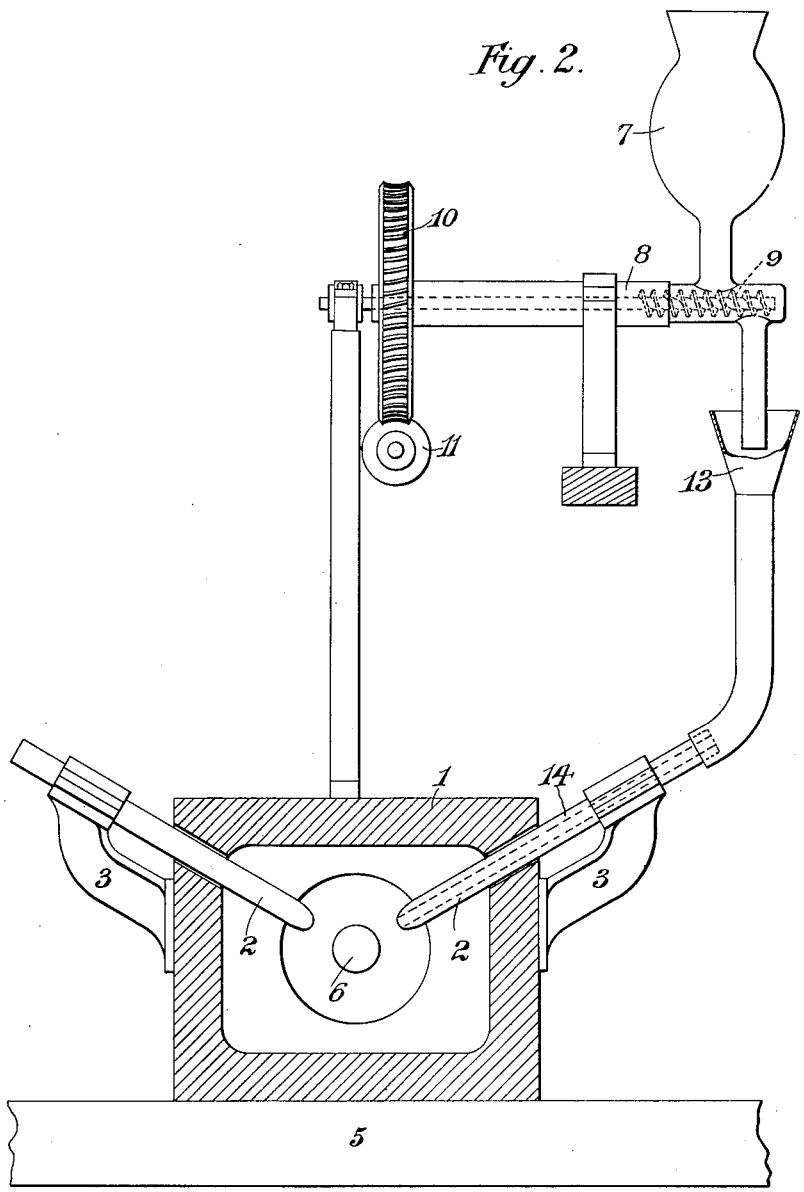
Figure 3:
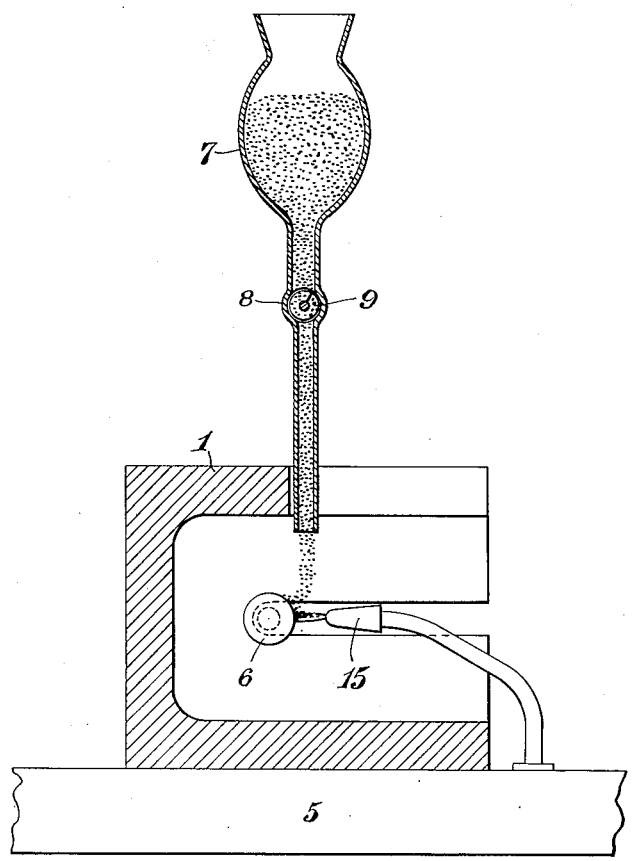

Figure 1 shows an arrangement wherein the silica particles are caused to fall as aforesaid onto the heated body, in the presence of an electric arc. Fig. 2 shows a modification wherein the silica particles are caused to pass through one of the electrodes and thence as aforesaid onto the heated body. Fig. 3 shows an arrangement wherein the heat is applied by a blow-pipe.

In all the figures like parts are marked with the same reference numerals.

Referring first to Fig. 1, the furnace 1 is provided with electrodes 2, carried by holders 3, capable of being moved along guideways 4, on the bed-plate 5. In the furnace 1, is an opening through which to introduce the heated body 6, of silica-glass upon which the particles of silica, to form a homogeneous mass of further silica-glass, are received. The particles of silica are contained in a receptacle 7, and pass into a tube 8, provided with a worm 9, rotatable in any suitable way, (such as by a worm-wheel 10, and worm 11,) so that the particles are propelled along the tube 8, and delivered into the furnace in a separated condition so as to be heated equally all around and fall upon the heated body 6.

The arrangement shown in Fig. 2 is generally similar to that shown in Fig. 1, except that the silica particles are delivered through a tube 13, and an axial perforation 14, in one of the electrodes. The said particles may be similarly delivered through both electrodes if desired.

Fig. 3 shows a similar arrangement for delivering the particles of silica, but the heat is supplied by a blow-pipe 15, in the presence of the heat of which, the particles fall, or are projected separately, upon, the heated body 6, which can, as in the other cases, be rotated, and moved longitudinally.

What I claim is—

1. The manufacture of silica glass by causing grains or particles of silica to fall or be projected separately through a heated zone and onto a movable heated body in a chamber said particles being subjected to a temperature sufficient to sinter them by this single operation into a homogeneous mass of silica-glass, substantially as hereinbefore explained.

2. The manufacture of silica-glass by causing grains or particles of silica to fall or be projected separately upon a movable body in a chamber, said body being maintained in a plastic condition by heat so that the grains or particles will adhere to the said body and form at one operation, under the action of heat, a homogeneous mass of silica-glass, substantially as hereinbefore explained.

3. The process of manufacturing silica-glass which consists in passing scattered particles of silica through a heated zone onto a movable heated receiving body in a chamber, said particles being subjected to a temperature sufficient to sinter them by this single operation into a homogeneous fused silica mass adapted to be at once manipulated into desired shape.

4. The process of manufacturing silica-glass which comprises passing particles of silica through a heated zone in scattered relation to each other so that each particle is heated from all sides during its passage through said zone, said particles being directed onto a movable heated receiving body, said particles being subjected to a temperature sufficient to sinter them by this single operation into a homogeneous mass of silica glass.

5. The process of manufacturing silica-glass which comprises passing a stream of scattered particles of silica through a heated zone onto a heated receiving body and maintaining the latter in plastic condition by the continued application of heat thereto during the deposit of the silica particles thereon, whereby a homogeneous fused silica mass is formed ready to be at once manipulated into desired shape.

In testimony whereof I have signed my name to this specification in the presence of two subscribing witnesses.

HENRY ANDREW KENT.

Witnesses:
WILLIAM GERALD REYNOLDS,
HERBERT D. JAMESON.